United States Patent [19]
Reed et al.

[11] Patent Number: 5,534,235
[45] Date of Patent: Jul. 9, 1996

[54] POLYMERS CONTAINING PHOSPHONIC ACID GROUPS FOR THE TREATMENT OF RED MUD IN THE BAYER PROCESS

[75] Inventors: Peter E. Reed, Plainfield; Robert P. Mahoney, Warrenville, both of Ill.

[73] Assignee: Nalco Chemical Company, Naperville, Ill.

[21] Appl. No.: 523,993

[22] Filed: Sep. 5, 1995

[51] Int. Cl.$^6$ .............................. C01F 7/00; B01D 21/00
[52] U.S. Cl. .......................... 423/121; 210/732; 210/733
[58] Field of Search .......................... 423/121; 210/732, 210/733

[56] References Cited

U.S. PATENT DOCUMENTS

| | | | |
|---|---|---|---|
| 3,085,853 | 4/1963 | Lesinski et al. | 23/52 |
| 3,390,959 | 7/1968 | Sibert | 210/733 |
| 3,397,953 | 8/1968 | Galvin et al. | 423/119 |
| 3,445,187 | 5/1969 | Sibert | 23/143 |
| 3,541,009 | 11/1970 | Arendt et al. | 210/52 |
| 3,681,012 | 8/1972 | Sibert | 23/143 |
| 4,678,585 | 7/1987 | Brownrigg | 423/121 |
| 4,678,840 | 7/1987 | Fong et al. | 525/340 |
| 4,767,540 | 8/1988 | Spitzer et al. | 210/728 |
| 5,008,089 | 4/1991 | Moody et al. | 423/121 |
| 5,217,620 | 6/1993 | Mahoney et al. | 210/728 |

OTHER PUBLICATIONS

Environmental Phosphorus Handbook, by E. J. Griffith, et al, pp. 258–259, no date.
"The Hydrolysis of Phosphonate Esters", by R. F. Hudson, et al, pp. 2463–2469, 1956, no month, no journal reference.

Primary Examiner—Steven Bos
Attorney, Agent, or Firm—James J. Drake; Robert A. Miller; Patricia A. Charlier

[57] ABSTRACT

The invention comprises a process for improved flocculation of Bayer process red mud-containing slurry. The improvement comprises adding to the red mud-containing liquor a phosphonic acid polymer optionally in addition to the conventional flocculant. The polymer is added to the red mud-containing liquor in an amount sufficient to reduce the concentration of suspended solids in the supernatant phase and/or increase the rate of sedimentation.

18 Claims, No Drawings

POLYMERS CONTAINING PHOSPHONIC ACID GROUPS FOR THE TREATMENT OF RED MUD IN THE BAYER PROCESS

BACKGROUND OF THE INVENTION

1. Field of the Invention

The present invention is a method for clarification of red mud-containing slurries, particularly the slurry generated in the Bayer process for the recovery of alumina from bauxite ore.

2. Description of the Prior Art

In the Bayer process for the production of alumina, bauxite ore is pulverized, slurred in water, and then digested with caustic at elevated temperatures and pressures. The caustic solution dissolves oxides of aluminum, forming an aqueous sodium aluminate solution. The caustic-insoluble constituents of bauxite ore (referred to as "red mud") are then separated from the aqueous phase containing the dissolved sodium aluminate. Solid alumina trihydrate product is precipitated out of the solution and collected as product.

In more detail, the pulverized bauxite ore is fed to a slurry mixer where a water slurry is prepared. The slurry makeup water is typically spent liquor (described below) and added caustic. This bauxite ore slurry is then diluted and passed through a digester or a series of digesters where alumina is released from the ore as caustic-soluble sodium aluminate. The digested slurry is then cooled to about 230° F., typically employing a series of flash tanks wherein heat and condensate are recovered. The aluminate liquor leaving the flashing operation contains from about 1 to about 20 weight percent suspended solids, which solids consist of the insoluble residue that remains after, or is precipitated during, digestion. The coarser solid particles may be removed from the aluminate liquor with a "sand trap" cyclone. The finer solid particles are generally separated from the liquor first by settling and then by filtration, if necessary. The slurry of aluminate liquor and the finer solids is normally first fed to the center well of a mud settler, or primary settler, where it is treated with a flocculant, and as the mud settles, clarified sodium aluminate solution, referred to as "green" or "pregnant" liquor, overflows a weir at the top. This overflow from the mud settling tank is passed to the subsequent process steps. If the aluminate liquor overflowing the settler contains an unacceptable concentration of suspended solids (at times from about 50 to about 500 mg of suspended solids per liter), it is then generally further clarified by filtration to give a filtrate with no more than about 10 mg suspended solids per liter of liquor. The treatment of the liquor collected after the primary settlement to remove any residual suspended solids before alumina trihydrate is recovered is referred to as a secondary clarification stage.

The clarified sodium aluminate liquor is seeded with alumina trihydrate crystals to induce precipitation of alumina in the form of alumina trihydrate, $Al(OH)_3$. The alumina trihydrate particles or crystals are then separated from the concentrated caustic liquor, and the remaining liquid phase, the spent liquor, is returned to the initial digestion step and employed as a digestant after reconstitution with caustic.

In another section of the Bayer circuit, the settled solids of the primary settler ("red mud") are withdrawn from the bottom of the settler and passed through a countercurrent washing circuit for recovery of sodium aluminate and soda. The countercurrent washing circuit utilizes two or more washers which receive a mud washer feed slurry from either the settler underflow or other washer underflow, as well as any dilution liquor. As noted above, the red mud does not include any coarser particles removed prior to feeding the slurry to the primary or mud settler.

The at least partial separation of the red mud solids from the pregnant liquor at elevated temperatures by settling or by filtration is expedited by the use of a flocculant. This initial clarification of the pregnant liquor into a clarified liquor phase is referred to as the primary settler stage. Flocculating agents improve the separation of insolubles by increasing the rate at which the solids settle, by reducing the amount of residual solids suspended in the liquor, and by decreasing the amount of liquor in the settled solids phase. Flocculation performance is highly important in the primary settlement stages. Red muds are comprised chiefly of iron oxides (at least about 50 weight percent of the red mud solids), together with silicon oxides, calcium oxides, sodium alumino-silicates, titanium oxides and other materials, and commonly represent from about 5 to about 50 percent of the dry weight of the bauxite ore. Generally these muds are comprised of very fine particles, which hinder the desired rapid and clean separation of red mud particles from the solubilized alumina liquor. If the rate of separation is slow, output is materially diminished and overall process efficiency is impaired. If the separation is not clean, the resultant aluminate liquor will require a more extensive treatment to remove residual solids, and/or the alumina trihydrate recovered will contain levels of impurities that are undesirably high for many end-uses.

The polysaccharides starch and dextran were used early in red mud flocculation. For instance, U.S. Pat. No. 3,085,853, Apr. 16, 1963, Lesinski et al., uses native dextrans to increase the rate of sedimentation of finely divided solids in aqueous suspensions and thereby facilitate the separation of such solids. Later synthetic polymeric flocculants became more commonly employed for the Bayer process. U.S. Pat No. 3,390,959 issued Jul. 2, 1968 to Sibert, uses acrylate homopolymers and copolymers which contain not more than 20% of other ethylenically unsaturated polymerizable polar monomers for the Bayer process. Included in Sibert's polar comonomers are acrylamide and diethylvinylphosphonate, among others. Diethylvinylphosphonate is the diethyl ester of vinylphosphonic acid, and can be hydrolyzed to the monoethyl ester in caustic solution. Complete hydrolysis of diethylvinylphosphonate groups to dibasic vinylphosphonic acid salt groups is not observed in caustic solution under Bayer process conditions, so the polymers of Sibert are neither converted to in use nor are equivalent to the phosphonic acid polymers of the present invention.

U.S. Pat. No. 3,397,953, Aug. 20, 1968, Galvin et al., uses a blend of starch and polyacrylic acid on red mud suspensions, noting that polyacrylic acid alone is not suitable as a flocculating agent. The polyacrylic acids exemplified generally have molecular weights of less than 300,000. The flocculation and sedimentation activity of the blend is exemplified in the primary settler stage of a bauxite process. U.S. Pat. No. 3,445,187, May 20, 1969, Sibert, uses synthetic acrylic acid polymer alone to enhance the rate of separation of red mud solids from the aqueous caustic solutions during secondary clarification steps. The synthetic polymer used contains at least about 80 weight percent of the acrylic acid mer unit, and has a molecular weight in excess of 50,000, and preferably in excess of 100,000. U.S. Pat. No. 3,541,009, Nov. 17, 1970, Arendt et al., uses a combination of causticized or modified starch, a water soluble polymer, and a caustic alkali to enhance the coagulation, sedimentation and/or filtration of aqueous suspensions of solids, including the settling of red mud from Bayer process liquor. The water soluble polymer is derived from at least one olefinically-unsaturated monomer and has a molecular weight in excess of 100,000.

U.S. Pat. No. 3,681,012, Aug. 1, 1972, Sibert, uses an acrylic acid polymer most preferably having a molecular weight of at least, 1,000,000, either alone or in combination with starch, for clarification of digested bauxite containing solubilized alumina and red mud residues. U.S. Pat. No. 4,767,540, Aug. 30, 1988, Spitzer et al., uses a polymer that contains hydroxamic acid groups. U.S. Pat. No. 5,008,089, Apr. 16, 1991, Moody et al., uses a combination of dextran and synthetic anionic polymer for flocculating red mud in Bayer process liquors.

U.S. Pat. No. 5,217,620, Jun. 8, 1993, Mahoney et al., uses a combination of pullulan, lactan, rhamsan, or zooglan with a conventional water soluble anionic flocculant for red mud settling.

The synthetic flocculating agents employed for the settling or filtration of red mud are generally water soluble polymers of one or more ethylenically-unsaturated monomers, and have been used together, as noted above, with starch and dextran for aluminate liquor clarification. The synthetic flocculating agents are usually anionic, and the optimum anionic content of such polymer is usually related to the alkalinity of the liquor. In the washing circuit, the early wash liquors have the highest alkalinity and may require a more highly anionic polymer than the later wash liquors.

It is an object of the present invention to provide a more effective flocculation for separating red mud from the red mud-containing liquors, particularly the primary settler liquor, of the Bayer process. It is an object of the present invention to provide a method whereby the suspended solids retained in the supernatant phase after flocculation of the red mud-containing liquors, particularly the primary settler liquor, of the Bayer process are diminished. It is an object of the present invention to provide a more effective Bayer process wherein flocculation for separating red mud from the red mud-containing liquors, particularly the primary settler liquor, is improved by a more complete flocculation of the solids. Such red mud-containing liquors include the liquors of the counter-current mud washers.

3. SUMMARY OF THE INVENTION

The invention comprises a process for improved flocculation of Bayer process red mud-containing liquor. The improvement comprises adding to the red mud-containing liquor a water-soluble phosphonic acid containing polymer by itself or in combination with a conventional flocculant. The polymer is added to the red mud-containing liquor in an amount sufficient to increase the rate of sedimentation and/or reduce the concentration of suspended solids in the supernatant phase.

DESCRIPTION OF THE PREFERRED EMBODIMENTS

The invention comprises a process for improved flocculation of Bayer process red mud-containing liquor. The conventional flocculation process to which the invention is an improvement comprises using a water-soluble flocculant to form a red mud phase and a supernatant phase from the red mud-containing liquor. The supernatant contains residual suspended solids. These flocculants are primarily derived from ethylenically-unsaturated monomers and are comprised of from about 0 to about 30 mole percent of nonionic units and from about 70 to about 100 mole percent of anionic units and have a weight average molecular weight of at least 500,000.

The red mud-containing slurry that is preferably treated by the process is characterized as having a total alkalinity of from about 10 to 300 grams per liter expressed as sodium carbonate. Further, the slurry is characterized as having from about 10 grams per liter to about 350 grams per liter insoluble solids content. The separation of the red mud is conducted at atmospheric pressure and at a temperature from about 30° C. to about 115° C. Preferably, the treated slurry is a primary settler feed slurry in the Bayer process. The red mud-containing slurry is further characterized as containing dissolved sodium aluminate.

Preferably, the polymer is added to the liquor in an amount of from about 0.5 to about 50 milligrams of polymer actives per liter. Further, the anionic polymer is preferably added in an amount of from about 0.001 to about 0.1 weight percent of polymer actives based on the weight of red mud solids in the slurry.

The method by which the red mud containing liquors of the Bayer process are clarified is comprised of using a phosphonic acid bearing polymer as a flocculant or coflocculant in the clarification process described above. The use of simple alkyl phosphonic acids as collectors in mineral processing is well known, particularly for the flotation of cassiterite. We have found that phosphonic acid bearing polymers provide unexpected benefits in terms of reducing the amount of suspended solids in the overflow liquor when used to clarify Bayer process liquor. The term phosphonic acid, when used herein, is intended to encompass the phosphonic acid salts produced when the phosphonic acid is dissolved in an aqueous media possessing a moderately low to a high pH. Furthermore, it is recognized that the phosphonic acids of the present invention will be present in the corresponding anionic salt form in the Bayer process liquor.

The phosphonic acid polymers of the present invention can be prepared by a variety of methods which generally fall into one of two categories: the polymerization of a phosphonic acid monomer or the post-modification of a polymer to introduce phosphonic acid groups into the polymer. In the former category, ethylenically-unsaturated phosphonic acids can be used to prepare phosphonic acid homopolymers and copolymers by addition polymerization methods. Polymerizations of this type are characterized by initiation, propagation, and termination events. The addition polymerization is carried out by using a free radical initiator to induce or initiate the successive additions of large numbers of the ethylenically-unsaturated monomers in a chain reaction which continues until the reactive propagating radical on the growing polymer chain is destroyed or terminated. Examples of such monomers include, but are not limited to, vinyl phosphonic acid (VPA), vinylidene diphosphonic acid (VDPA), isopropenyl phosphonic acid, and 2-acrylamido-2-methylpropanephosphonic acid. It is likely that cost and performance could be optimized by using the types of monomers described above in combination with other anionic or neutral comonomers to produce copolymeric or terpolymeric flocculants. Suitable comonomers include, but are not limited to, acrylic acid or one of its salts, acrylamide, methacrylic acid or one of its salts, methacrylamide, maleic acid or one of its salts, 2-acrylamido-2-methylpropane-sulfonic acid or one of its salts, maleic anhydride, methyl acrylate, ethyl acrylate, or methyl methacrylate.

The polymerization methods that can be employed to produce the polymers used in the present invention include free radical methods which are well known to those skilled in the art, including solution polymerization, inverse emulsion polymerization, inverse microsuspension polymerization, and dispersion polymerization. Latex poly(acrylic acid) homopolymers and copolymers, prepared by inverse emulsion or inverse microsuspension polymerization, have found widespread use in the clarification of Bayer process liquors. These products typically contain, on a weight percent basis, about one third polymer, about one third water and dissolved salts, and about one third hydrocarbon oil and dissolved surfactants. The phosphonic acid monomers described above can be conveniently incorporated into these latex polymers.

Another general method that can be used to produce phosphonic acid polymers which can be used in the present invention encompasses the reaction of a preformed polymer with a phosphorus containing reagent to produce a phosphonic acid modified polymer. For example, polymers bearing amidoalkyl phosphonic acid groups can be prepared by the amidation or transamidation of polymers bearing carboxylic acid or amide groups with aminoalkyl phosphonic acids. Suitable aminoalkyl phosphonic acids include, but are not limited to, aminomethane phosphonic acid (AMPA), N,N-bis(phosphonoalkyl) alkylenediamines prepared from diamines and haloalkyl phosphonic acids or formaldehyde/ phosphorous acid, 1-amino-1,1-diphosphonoalkanes prepared from nitriles and phosphorous acid, and other aminoalkyl phosphonic acids prepared by the reaction of ethylenically-unsaturated amines with phosphorus reagents bearing a phosphorus-hydrogen bond. In another example, aminoalkyl phosphonic acid beating polymers can be produced by the reaction of an amine-bearing polymer with a haloalkane phosphonic acid or with formaldehyde/phosphorous add. In a final example, phosphonic acid polymers can be prepared by the oxidation of phosphinic acid bearing polymers with oxidants such as hydrogen peroxide.

The examples provided above are for illustrative purposes only and are not intended to be all-inclusive. Within the scope of this invention, any water soluble, phosphonic acid containing polymer may be used to clarify Bayer process liquor. The optimum amount of phosphonic acid groups present on the polymer will depend on several factors such as cost and performance, and will range from about 1 mole percent to 100 mole percent, with a preferred range of 1 to 30 mole percent. In a preferred form, the polymer will posses, in addition to phosphonic acid groups, high molecular weight and high anionic charge density. The useful polymer molecular weights range from about $1 \times 10^4$ to about $3 \times 10^7$ g/M. It is usually preferable to use as high of a molecular weight as possible for a given polymer, assuming that the polymer backbone is linear and not highly crosslinked. It is advantageous, particularly in the settler, to use a phosphonic acid polymer possessing a high anionic charge density. This can often be achieved by the incorporating an anionic monomer, such as acrylic acid or maleic acid, into the phosphonic acid polymer.

The following examples are presented to describe preferred embodiments and utilities of the invention and are not meant to limit the invention unless otherwise stated in the claims appended hereto.

EXAMPLE 1

A vinyl phosphonic acid/acrylic acid latex copolymer (Polymer A) was prepared according to the formulation shown below using an inverse microsuspension technique. Latex polymers of this type are readily prepared using the methods set forth in U.S. Pat. No. 4,584,358, the disclosure of which is incorporated herein by reference. Using these methods, this copolymer was prepared at pH 6 by reaction for four hours at 45 degrees Celsius, followed by a one hour post-heat at 65 degrees Celsius. The vinyl phosphonic acid was charged at a level of 25 mole percent. The composition of the copolymer product was determined by $^{13}$C and $^{31}$P NMR to be 85/15 acrylic acid/vinyl phosphonic acid, and the reduced specific viscosity of the polymer was determined to be 5.4 dl/g.

|  | Wt. % |
|---|---|
| Monomer Phase: | |
| Vinyl Phosphonic Acid | 7.48 |
| Deionized Water | 28.47 |
| Acrylic Acid | 15.17 |
| 50% NaOH | 24.23 |
| Oil Phase: | |
| LOPS Hydrocarbon Oil | 22.00 |
| Span 80 Surfactant | 1.04 |
| Tween 61 Surfactant | 1.56 |
| Initiator: | |
| AIBN | 00.05 |
|  | 100.00 |

EXAMPLE 2

To a poly(acrylic acid) latex polymer was added a surfactant solution and an AMPA solution according to the formulation outlined below. The reaction mixture was then purged with nitrogen, sealed in a high pressure reaction vessel, and heated to 130 degrees Celsius for 5 hours with stirring. Analysis of the product mixture by $^{31}$P NMR showed a 48% conversion of the initially charged 15 mole percent AMPA to product, corresponding to a 93/7 acrylic acid/acrylamidomethane phosphonic acid copolymer composition (Polymer B).

|  | Wt. % |
|---|---|
| Latex polymer: | |
| 23 wt. % p(acrylic acid) | 55.64 |
| 40% neutralized with NaOH | |
| pH 4.7 | |
| Surfactant Solution: | |
| Escaid 110 Hydrocarbon Oil | 11.13 |
| Span 80 Surfactant | 1.11 |
| Brij 93 Surfactant | 1.11 |
| AMPA Solution: | |
| Aminomethane Phosphonic Acid (AMPA) | 6.01 |
| Deionized Water | 23.00 |
| 50% NaOH | 1.64 |
| Sodium Thiocyanate | 0.36 |
|  | 100.00 |

EXAMPLE 3

A solution of 14.6 parts acrylic acid and 5.4 parts vinylidene diphosphonic acid tetrasodium salt dissolved in 62.0 parts deionized water was placed in a reaction vessel, purged with nitrogen, and heated to 50 degrees Celsius. Then a solution of 0.01 parts ammonium persulfate dissolved in 0.20 parts deionized water was added, followed immediately by a solution of 0.01 parts sodium bisulfite dissolved in 0.20 parts deionized water. After the initial exotherm had subsided, the reaction solution was maintained at 90 degrees Celsius for 2 hours. Then 17.6 parts deionized water was added and the reaction was cooled to room temperature. The product was shown by $^{31}$P NMR to be comprised of a 96/4 acrylic acid/vinylidene diphosphonic acid copolymer (Polymer C).

EXAMPLE 4

A vinyl phosphonic acid/acrylic acid latex copolymer was prepared using an inverse microsuspension technique according to the method described in Example 1 except that the vinyl phosphonic acid was charged at a level of 15 mole percent instead of 25 mole percent, ammonium hydroxide was used for neutralization instead of sodium hydroxide, and the polymerization was carried out at a pH of 8 (Polymer D).

EXAMPLE 5

An AMPA-modified latex polymer was prepared according to the procedure described in Example 2 except that an 80/20 acrylic acid/acrylamide latex polymer was used instead of the poly(acrylic acid) latex polymer and the reaction was carried out at a pH of 5.5. Analysis of the product mixture by $^{31}$P NMR showed a 45% conversion of the initially charged 15 mole percent AMPA to product, corresponding to a (93)/7 (acrylic acid/acrylamide)/acrylamidomethane phosphonic acid copolymer composition (Polymer E).

EXAMPLE 6

An AMPA-modified latex polymer was prepared according to the procedure described in Example 2 except that the reaction was run for 3 hours instead of 5 hours. Analysis of the product mixture by $^{31}$P and $^{13}$C NMR showed a polymer composition of 96/4 acrylic acid/acrylamidomethane phosphonic acid (Polymer F).

TEST PROCEDURE FOR EXAMPLES 7–18

The general procedure employed in the following examples is a laboratory test that determines the performance of polymers as follows.

1. One-liter size test samples of a 90° to 100° C. settler feed are obtained from a sample of settler feed. (Such settler feeds were obtained from various bauxite refineries.) To assure that the contents of each test sample are uniform, the settler feed is ladled from a bucket into one-liter graduated cylinders as follows. The settler feed is stirred before each portion taken and the remainders from each scoop being returned to the bucket; the graduated cylinders are first filled only half way; and then the graduated cylinders are filled to the one-liter mark in a reverse order. The graduated cylinders are then stoppered and placed in a 95° to 100° C. water bath or oven, and held therein until the testing begins. For washer slurry tests, washer feed is used and it is maintained at the temperature of that washer.
2. A cylinder is removed from the water bath or oven, and the contents thereof are adjusted in temperature to 95°±1° C. in a 2-liter stainless steel bucket, and returned to the cylinder.
3. The cylinder contents are mixed by plunging two times with a perforated stainless steel disk or rubber stopper attached to the end of a stainless steel rod, which plunger is also used for the mixing in subsequent steps.
4. An aqueous solution of polymer is added by syringing the appropriate volumetric dose into the test sample and is then admixed therein by plunging four times. In examples with two or more polymers added, the first polymer solution is added and plunged two times then the second polymer solution is added and plunged two times. The comparative flocculant used for the tests of all the present examples was an ammonium acrylate polymer of within the molecular weight range of from about 1,000,000 to about 20,000,000, although the substitution of other anionic flocculants in these the tests would be expected to provide the same relative results.
5. A mud-clear liquor/mud interface forms in the cylinder. The time required for this interface to settle from the 900 ml mark down to the 700 ml of the graduated cylinder is recorded together with the time of day.
6. When the interface reaches the 700 ml mark, the cylinder is stoppered and returned to the water bath or oven, and held therein at 95° to 100° C. for a specific time period, described below. The level of the mud bed (the lower phase defined by the interface) is recorded (in ml) and the supernate is sampled by syringing 10 to 100 ml of liquor from a given depth in the cylinder.
7. The time period is the time elapsed from the time recorded in step 5 above (at which time the interface reaches the 700 ml mark) to the supernate sampling of step 6 above. This period may be between 15 and 60 minutes, provided it is the same for all cylinders in a test series. The depth from which the supernate is taken may be between 1 and 4 inches, provided such depth is the same for all cylinders in a test series.
8. The amount of suspended solids in the supernate sample taken from each cylinder is determined by standard optical turbidity measurement techniques and is the primary measure of clarification aid performance.

The amount of polymer added in Step 4 is noted in the specific examples in terms of mg of flocculant actives per liter of settler feed. All other test conditions and any test procedure variations are set fourth in the specific examples.

EXAMPLE 7

Using the test procedure described above, a series of tests were conducted using settler feed from a bauxite refinery. The phosphonic acid polymer (Polymer A) was compared with a polyacrylate and starch combination which is the industry standard treatment. The supernatant phase turbidity from Polymer A treatment was lower than from polyacrylate and starch treatment, as shown in Table 1.

TABLE 1

| TREATMENT | DOSE (mg/L) | SETTLING RATE (ft/hr) | TURBIDITY (NTU) |
| --- | --- | --- | --- |
| Polyacrylate + Starch | 5.2 + 120 | 6.9 | 1040 |
| Polymer A | 11.4 | 1.4 | 640 |
| Polyacrylate + Starch | 5.2 + 120 | 2.4 | 1120 |
| Polyacrylate + Starch | 5.2 + 120 | 1.4 | 1152 |

EXAMPLE 8

Using the test procedure described above, a series of tests were conducted using settler feed from a bauxite refinery. The phosphonic acid polymer (polymer A) was added after the polyacrylate and compared with a polyacrylate and starch combination. The supernatant phase turbidity from polyacrylate/Polymer A treatment was lower than from polyacrylate and starch treatment, as shown in Table 2. Simultaneous addition of the two polymers (denoted polyacrylate+Polymer A) also gave lower turbidity than polyacrylate +starch. See Table 2.

TABLE 2

| TREATMENT | DOSE (mg/L) | SETTLING RATE (ft/hr) | TURBIDITY (NTU) |
|---|---|---|---|
| Polyacrylate + Starch | 5.2 + 120 | 29 | 352 |
| Polyacrylate/ Polymer A | 5.2/9.1 | 79 | 208 |
| Polyacrylate + Starch | 5.2 + 120 | 14 | 320 |
| Polyacrylate/ Polymer A | 4.0/6.8 | 48 | 208 |
| Polyacrylate + Polymer A | 4.0 + 6.8 | 39 | 288 |
| Polyacrylate + Starch | 5.2 + 120 | 8.1 | 368 |

EXAMPLE 9

Using the test procedure described above, a series of tests were conducted using settler feed from a bauxite refinery. The phosphonic acid polymer (Polymer A) was added after the polyacrylate+starch combination and compared with a polyacrylate and starch combination. The supernatant phase turbidity from polyacrylate+starch followed by Polymer A treatment was lower than from polyacrylate and starch treatment, as shown in Table 3. In this example, the gravimetric suspended solids in the supernatant phase were determined by standard filtration and drying techniques, showing agreement with the turbidity (NTU) results. See Table 3.

TABLE 3

| TREATMENT | DOSE (mg/L) | SETTLING RATE (ft/hr) | TURBIDITY (NTU) | SUSPENDED SOLIDS (Mg/L) |
|---|---|---|---|---|
| Polyacrylate + Starch | 4.5 + 100 | 24 | 110 | 298 |
| Polyacrylate + Starch | 4.5 + 100 | 23 | 110 | 299 |
| Polyacrylate + Starch/Polymer A | 4.5 + 100/ 6/8 | 62 | 70 | 127 |

EXAMPLE 10

Using the test procedure described above, a series of tests were conducted using settler feed from a bauxite refinery. The phosphonic acid polymer (Polymer A) was added as the flocculant and compared with a polyacrylate. The treatment of Polymer A followed by polyacrylate was also compared with polyacrylate alone. The supernatant phase turbidity from Polymer A treatment or Polymer A followed by polyacrylate was lower than from polyacrylate treatment, as shown in Table 4. The combined (two polymer) treatment gave increased settling rate and improved turbidity over the polyacrylate standard. See Table 4.

TABLE 4

| TREATMENT | DOSE (mg/L) | SETTLING RATE (ft/hr) | TURBIDITY (NTU) |
|---|---|---|---|
| Polymer A | 13.6 | 36 | 70 |

TABLE 4-continued

| TREATMENT | DOSE (mg/L) | SETTLING RATE (ft/hr) | TURBIDITY (NTU) |
|---|---|---|---|
| Polyacrylate | 2.4 | 82 | 150 |
| Polymer A/ Polyacrylate | 13.6/2.4 | 105 | 95 |

EXAMPLE 11

Using the test procedure described above, a series of tests were conducted using settler feed from a bauxite refinery. The phosphonic acid polymer (Polymer A) was added either as the flocculant, after the polyacrylate, or simultaneous with the polyacrylate and compared with the polyacrylate alone. All treatments involving Polymer A gave a supernatant phase turbidity lower than from polyacrylate treatment alone. See Table 5.

TABLE 5

| TREATMENT | DOSE (mg/L) | SETTLING RATE (ft/hr) | TURBIDITY (NTU) |
|---|---|---|---|
| Polymer A | 9.1 | 46 | 70 |
| Polymer A | 4.5 | 19 | 85 |
| Polymer A | 13.6 | 62 | 55 |
| Polyacrylate | 1.6 | 36 | 165 |
| Polyacrylate/ Polymer A | 1.6/2.3 | 75 | 125 |
| Polyacylate + Polymer A | 1.6 + 2.3 | 52 | 100 |
| Polyacrylate | 1.6 | 46 | 160 |
| Polyacrylate | 1.6 | 98 | 195 |

EXAMPLE 12

Using the test procedure described above, a series of tests were conducted using settler feed from a bauxite refinery. The phosphonic acid polymer (Polymer A) was added after the polyacrylate and compared with the polyacrylate alone. All treatments involving Polymer A gave a supernatant phase turbidity lower than from polyacrylate treatment alone. See Table 6.

TABLE 6

| TREATMENT | DOSE (mg/L) | SETTLING RATE (ft/hr) | TURBIDITY (NTU) |
|---|---|---|---|
| Polyacrylate/ Polymer A | 2.8/2.3 | 72 | 130 |
| Polyacrylate | 2.8 | 62 | 175 |
| Polyacrylate/ Polymer A | 2.8/1.1 | 59 | 160 |
| Polyacrylate | 2.8 | 56 | 195 |
| Polyacrylate/ Polymer A | 2.8/3.4 | 85 | 130 |
| Polyacrylate | 2.8 | 62 | 190 |

EXAMPLE 13

Using the test procedure described above, a series of tests were conducted using settler feed from a bauxite refinery. The phosphonic acid polymer (Polymer B) was added as a flocculant and compared with the polyacrylate. Polymer B gave a supernatant phase turbidity lower than from polyacrylate treatment. See Table 7.

TABLE 7

| TREATMENT | DOSE (mg/L) | SETTLING RATE (ft/hr) | TURBIDITY (NTU) |
| --- | --- | --- | --- |
| Polyacrylate | 6 | 80 | 616 |
| Polymer B | 4.4 | 17 | 480 |
| Polyacrylate | 4.8 | 43 | 560 |
| Polymer B | 5.4 | 26 | 464 |
| Polyacrylate | 3.6 | 18 | 512 |
| Polymer B | 6.4 | 38 | 504 |

EXAMPLE 14

Using the test procedure described above, a series of tests were conducted using settler feed from a bauxite refinery. The phosphonic acid polymer (Polymer C) was added after the polyacrylate flocculant and compared with the polyacrylate alone. The combined treatment including Polymer C gave a supernatant phase turbidity lower than from polyacrylate treatment alone. See Table 8.

TABLE 8

| TREATMENT | DOSE (mg/L) | SETTLING RATE (ft/hr) | TURBIDITY (NTU) |
| --- | --- | --- | --- |
| Polyacrylate | 4.0 | 12 | 480 |
| Polyacrylate | 5.2 | 35 | 552 |
| Polyacrylate/ Polymer C | 5.2/9.0 | 8.6 | 416 |

EXAMPLE 15

Using the test procedure described above, a series of tests were conducted using settler feed from a bauxite refinery. The phosphonic acid polymers C and D were added before the polyacrylate flocculant and compared with the polyacrylate alone. The phosphonic acid polymer A was added alone as a flocculant and compared to the polyacrylate. The treatments including any of the phosphonated polymers gave a supernatant phase turbidity lower than from polyacrylate treatment alone. See Table 9.

TABLE 9

| TREATMENT | DOSE (mg/L) | SETTLING RATE (ft/hr) | TURBIDITY (NTU) |
| --- | --- | --- | --- |
| Polyacrylate | 5.2 | 33 | 477 |
| Polyacrylate | 6.4 | 64 | 441 |
| Polymer D/ Polyacrylate | 29/5.2 | 113 | 190 |
| Polymer A | 23 | 24 | 186 |
| Polymer C/ Polyacrylate | 18/5.2 | 63 | 245 |
| Polymer A | 34 | 41 | 237 |
| Polymer C/ Polyacrylate | 18/4.0 | 34 | 340 |

EXAMPLE 16

Using the test procedure described above, a series of tests were conducted using settler feed from a bauxite refinery. The phosphonic acid polymer A was added before the polyacrylate flocculant or alone as a flocculant, and compared with the polyacrylate alone. The treatments including the phosphonated polymer gave a supernatant phase turbidity lower than from polyacrylate treatment alone. See Table 10.

TABLE 10

| TREATMENT | DOSE (mg/L) | SETTLING RATE (ft/hr) | TURBIDITY (NTU) |
| --- | --- | --- | --- |
| Polyacrylate | 5.2 | 38 | 459 |
| Polymer A | 23 | 25 | 182 |
| Polyacrylate | 4.0 | 13 | 452 |
| Polymer A/ Polyacrylate | 11.4/2.4 | 82 | 109 |
| Polymer A/ Polyacrylate | 5.6/1.6 | 22 | 318 |
| Polymer A/ Polyacrylate | 5.6/2.0 | 28 | 333 |
| Polymer A/ Polyacrylate | 3.4/2.4 | 27 | 410 |

EXAMPLE 17

Using the test procedure described above, a series of tests were conducted using settler feed from a bauxite refinery. The phosphonic acid polymer A was added before the polyacrylate flocculant and compared with the polyacrylate alone and the polyacrylate+starch combination. The treatments including the phosphonated polymer gave a supernatant phase turbidity lower than from polyacrylate treatment with or without starch. See Table 11.

TABLE 11

| TREATMENT | DOSE (mg/L) | SETTLING RATE (ft/hr) | TURBIDITY (NTU) |
| --- | --- | --- | --- |
| Polyacrylate | 2.8 | 12 | 312 |
| Polyacrylate | 4.4 | 20 | 272 |
| Polymer A/ Polyacrylate | 23/2.0 | 3.8 | 160 |
| Polymer A/ Polyacrylate | 9.1/4.4 | 4.8 | 176 |
| Polyacrylate + Starch | 6.0 + 250 | 3.2 | 272 |
| Polyacrylate + Starch | 8.0 + 330 | 1.9 | 272 |
| Polyacrylate | 8.0 | 18 | 344 |

EXAMPLE 18

Using the test procedure described above, a series of tests were conducted using red mud washer slurry from a bauxite refinery. The phosphonic acid polymers E and F were added alone as flocculants and compared with the industry standard poly(acrylate-acrylamide) washer flocculant. The treatments with phosphonated polymers gave a supernatant phase turbidity lower than from poly(acrylate-acrylamide) treatment. See Table 12.

TABLE 12

| TREATMENT | DOSE (mg/L) | SETTLING RATE (ft/hr) | TURBIDITY (NTU) |
| --- | --- | --- | --- |
| Polymer E | 12.8 | 108 | 116 |
| Polymer E | 8.6 | 28 | 110 |
| Polyacrylate-acrylamide | 3.2 | 7.9 | 182 |
| Polyacrylate-acrylamide | 4.4 | 142 | 236 |
| Polymer F | 5.4 | 120 | 110 |
| Polymer F | 4.1 | 26 | 144 |
| Polymer F | 4.6 | 52 | 136 |
| Polyacrylate-acrylamide | 3.8 | 29 | 300 |

EXAMPLE 19

To differentiate phosphonic acids from phosphonate esters, a model compound was hydrolyzed in synthetic Bayer liquor to compare the polymer described in U.S. Pat. No. 3,390,959 to the polymer of the invention. The model compound was diethylmethylphosphonate (DEMP), which is the diethyl ester of methylphosphonic acid (MPA). DEMP was hydrolyzed in boiling 15% NaOH solution for six minutes, and an analysis of the reaction mixture showed quantitative conversion of DEMP to the half ester with no MPA product formed. The analysis was performed by $^{31}P$ NMR and $^{13}C$ NMR using authentic DEMP and MPA standards.

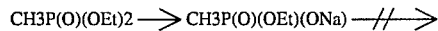

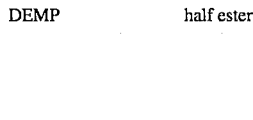

Since the model compound hydrolyzed only to the half ester, Sibert's diethylvinylphosphonate (DEVP) would only hydrolyze to its half ester in Bayer liquor in the amount of time available before flocculation. The experiment showed that the VPA polymer of the invention could not be formed by hydrolysis of Sibert's material in Bayer process conditions.

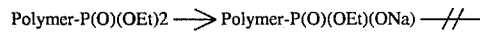

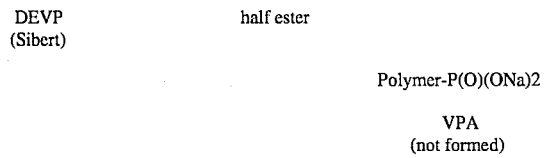

Changes can be made in the composition, operation and arrangement of the method of the present invention described herein without departing from the concept and scope of the invention as defined in the following claims:

We claim:

1. A process for treating Bayer process red mud-containing liquor consisting of adding to the liquor a phosphonic acid polymer to form a red mud phase and a clarified liquor phase, the polymer being added in an amount sufficient to form a red mud phase having a concentration of solids that is at least about 150% of the initial concentration of solids in the red mud-containing liquor.

2. The process of claim 1, wherein suspended solids are concentrated by sedimentation.

3. The process of claim 1, wherein the phosphonic acid polymer contains about 70–100% anionic mer units and wherein the anionic mer units contain about 1–50% phosphonic acid mer units.

4. The process of claim 1, wherein the phosphonic acid polymer is produced by the polymerization of a phosphonic acid monomer.

5. The process of claim 4, wherein the phosphonic acid polymer is an acrylic acid/vinyl phosphonic acid copolymer comprised of about 1–30 mole percent vinyl phosphonic acid.

6. The process of claim 4, wherein the phosphonic acid polymer is an acrylic acid/vinylidene diphosphonic acid copolymer comprised of about 1–30 mole percent vinylidene diphosphonic acid.

7. The process of claim 1, wherein the phosphonic acid polymer is produced by transamidation of an aminoalkyl phosphonic acid with a polymer selected from the group consisting of polymers bearing carboxylic acid groups and polymers bearing amide groups.

8. The process of claim 1, wherein the phosphonic acid polymer is produced by the reaction of an amine-bearing polymer to form phosphonomethyl groups.

9. The process of claim 1, wherein the total alkalinity of the red mud-containing liquor is from about 10 to 300 grams per liter, expressed as sodium carbonate.

10. The process of claim 1, wherein the solids content of the red mud-containing liquor is from about 10 grams per liter to about 350 grams per liter.

11. The process of claim 1, wherein the treatment of the red mud-containing liquor is conducted at atmospheric pressure and at a temperature of from 30° C. to about 115° C.

12. The process of claim 1, wherein the red mud-containing liquor is a primary settler feed.

13. The process of claim 1, wherein the red mud-containing liquor is a mud washer feed slurry.

14. In a Bayer process wherein bauxite ore is digested in an aqueous alkaline medium wherein alumina present in the bauxite ore is solubilized in the aqueous medium providing a red mud-containing liquor containing dissolved sodium aluminate and red mud solids and the red mud-containing liquor is treated to separate the mud solids from the liquor, the improvement consisting of:

adding to the red mud-containing liquor a phosphonic acid polymer in an amount of from about 0.5 to about 50 milligrams per liter of red mud-containing liquor.

15. The process of claim 14, wherein the polymer is added to the red mud-containing liquor in an amount of from about 0.001 to about 0.1 weight percent of polymer based on the weight of red mud solids in the red mud-containing liquor.

16. The process of claim 14, wherein the polymer is added to the red mud-containing liquor as an alkaline aqueous solution having a pH of at least about 9.

17. The process of claim 14, wherein the total alkalinity of the red mud-containing liquor is from about 10 to 300 grams per liter, expressed as sodium carbonate;

the solids content of the red mud-containing fed slurry is from about 25 grams per liter to about 350 grams per liter; and the treatment of the red mud-containing liquor is conducted at atmospheric pressure and at a temperature of from about 30° C. to about 115° C.

18. The process of claim 14, wherein the red mud-containing liquor is a primary settler feed.

* * * * *